United States Patent [19]
Carn

[11] Patent Number: 5,806,451
[45] Date of Patent: Sep. 15, 1998

[54] RIGGING, PARTICULARY FOR BICYCLES

[75] Inventor: Patrick Carn, Quimper, France

[73] Assignee: Tanguy Carn, France

[21] Appl. No.: 776,721

[22] PCT Filed: Jul. 31, 1995

[86] PCT No.: PCT/FR95/01024

§ 371 Date: Jan. 31, 1997

§ 102(e) Date: Jan. 31, 1997

[87] PCT Pub. No.: WO96/04166

PCT Pub. Date: Feb. 15, 1996

[30] Foreign Application Priority Data

Aug. 1, 1994 [FR] France .................................. 94 09514

[51] Int. Cl.⁶ ...................................................... B63H 9/08
[52] U.S. Cl. ........................... 114/102; 280/213; 280/810
[58] Field of Search .................................... 114/102, 103, 114/39.2, 39.1; 280/213, 810

[56] References Cited

FOREIGN PATENT DOCUMENTS

| 0 031 074 | 7/1981 | European Pat. Off. ................ 114/103 |
| 0 129 212 | 12/1984 | European Pat. Off. . |
| 1156952 | 5/1958 | France . |
| 32 08 340 A1 | 9/1983 | Germany . |
| WO 85/00336 | 1/1985 | WIPO . |

*Primary Examiner*—Sherman Basinger
*Attorney, Agent, or Firm*—Eckert Seamans Cherin & Mellott

[57] ABSTRACT

Rigging for a land or water vehicle comprises a symmetrical sail and a support therefore which is fitted with a tension member, the frame supporting the sail comprises two vertical uprights assembled together by hinged transverse bars, the rigging becoming asymmetrical when the middle tension member is actuated.

18 Claims, 3 Drawing Sheets

RIGGING, PARTICULARY FOR BICYCLES

The present invention relates to symmetrical rigging having improved aerodynamic qualities and simplified handling enabling its user to retain great freedom of movement, in particular for a bicycle while maintaining the bicycle's intrinsic qualities of pedalling, steering, and size, and in particular while leaving the hands free to hold the handlebar under any conditions of use or of transporting the rigging when not in use.

BACKGROUND OF THE INVENTION

Numerous wind-driven propulsion systems for application to bicycles have already been proposed. They are difficult to operate or they are unsuitable for riding close to the wind.

OBJECTS AND SUMMARY OF THE INVENTION

An object of the present invention is to remedy those drawbacks by taking the best points of existing embodiments, and in particular the improvements to rigging constituting the subject matter of the following patents: EP-A-0 151 591, FR-A-1 156 952, and DE-A 3208340.

FR-A-1 156 952 describes an elliptical or circular sail that is positioned relative to the boat by rods, wires, or cables. DE-A 3 208 340 describes a sail frame made up of horizontal and vertical elements. Finally, EP-A-0 151 591 describes a dismountable elliptical frame constituted by two flexible uprights united at their ends which are themselves interconnected by a tension member enabling the curvature of the uprights, and hence the belly of the sail, to be modified, the tension member passing outside a horizontal spar fixed to the uprights.

According to the present invention, the rigging is made asymmetrical by lateral deformation of the frame which is constituted by two vertical uprights and two horizontal bars uniting the ends of the uprights, said deformation being obtained by applying transverse stress to the tension member uniting the vertical bars, which tension member is itself secured to a horizontal spar uniting the uprights by means of a boom pivoted from the middle of the spar.

According to another characteristic of the invention, the rigging is associated with a bicycle by means of two angled bars fixed by hinges to the sides of the rigging, engaged in two parallel tubes situated on either side of the bicycle frame, and capable of pivoting about a horizontal pin secured to the frame. The two tubes also support elements of a "bowsprit" or jib surrounding the steering column and including at one end a control for controlling the position and the profile of the rigging. This control may be a cord passing through a pulley fixed to the jib and connected to a portion of the rigging, in particular the tension member of the rigging.

According to another characteristic of the rigging, the sail is provided around its periphery with lacing which, on being tightened, makes it possible to envelop the uprights and the bars of the rigging in the fold of the sail so that the surface of the sail presents an aerodynamic suction surface relative to the uprights.

BRIEF DESCRIPTION OF THE DRAWINGS

Other characteristics and advantages of the invention appear from the following description of particular embodiments, given solely as non-limiting examples, and with reference to the drawings, in which.

MORE DETAILED DESCRIPTION

Figure 1:
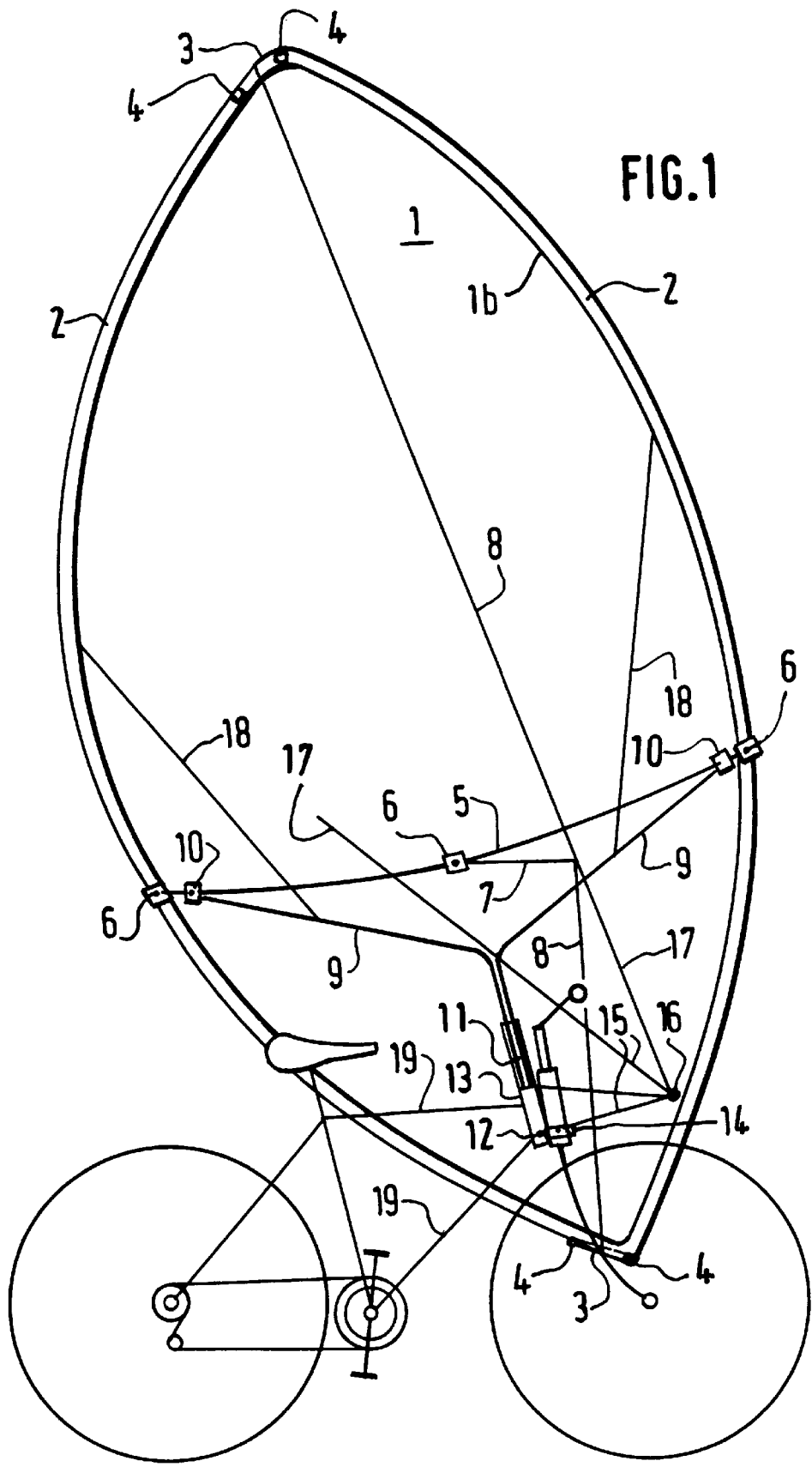
FIG. 1 is a side view of rigging of the invention fitted to a bicycle.
Figure 2:
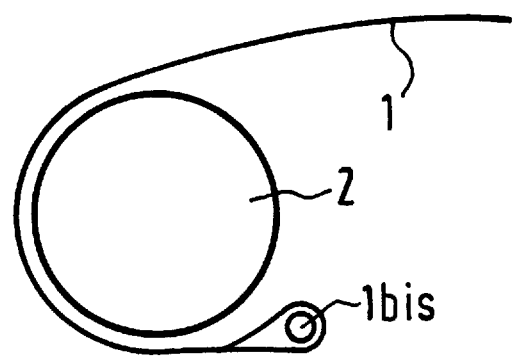
FIG. 2 is a section view showing how the sail is mounted on the uprights of the rigging.

In FIGS. 1 and 2, the sail 1 is tensioned over the uprights 2 and the bars 3 by enveloping them in a fold tightened by lacing 1 bis (FIG. 2) which serves to control envelopment by the extent to which it is tightened. The bars 3 are united at the top and bottom ends of the uprights 2 by hinges 4 enabling the quadrilateral defined in this way to be deformed. A middle tension member 8 of adjustable length unites the two bars 3 by passing via the end of a boom 7 mounted on a spar 5 via a hinge 6. The spar 5 carries two rods 9 via two hinges 10. The rods are angled and their ends are rotatably received in two tubes 11.

Figure 4:
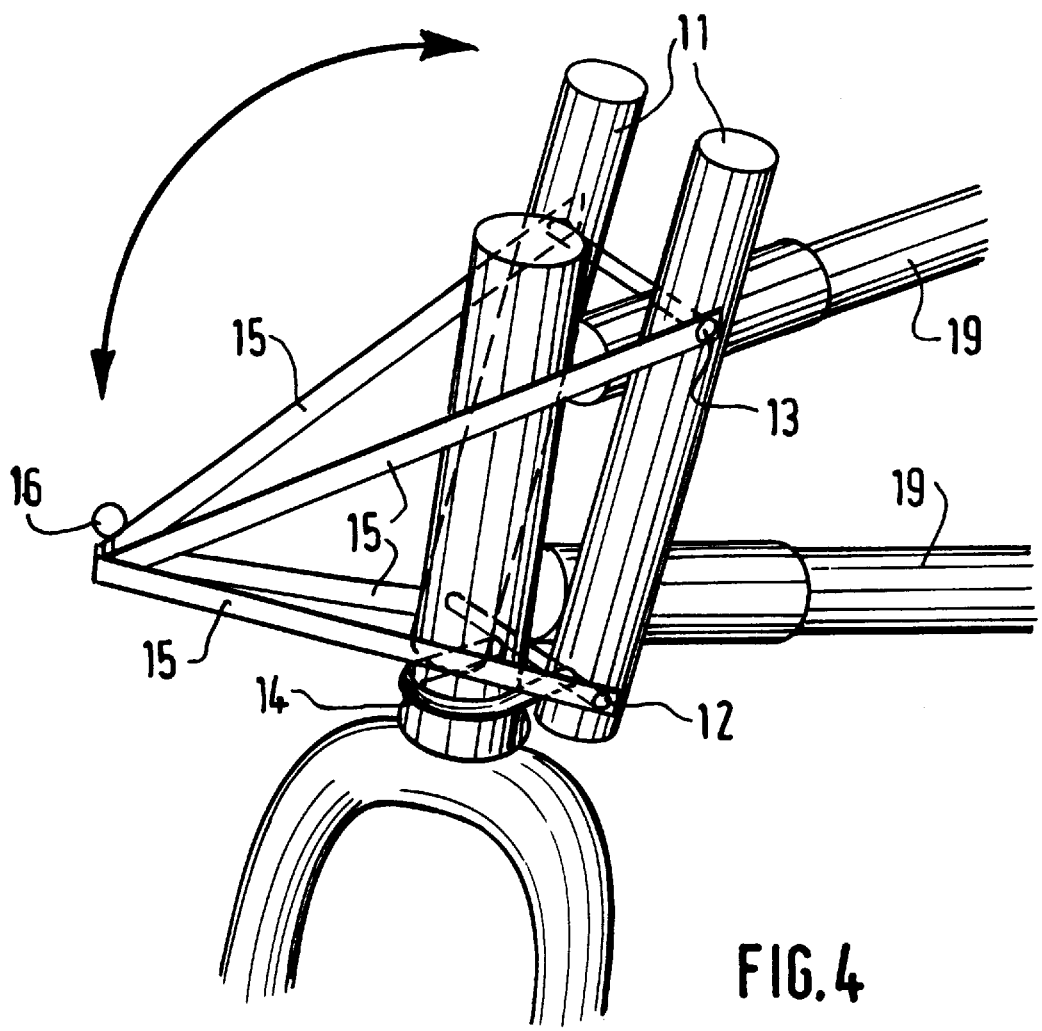
FIG. 4 is a perspective view of the support for the rigging on a bicycle.

FIG. 4 shows the rigging support in more detailed manner: the tubes 11 including flats are situated on either side of the bicycle frame 19 by means of two pins 12 and 13. The pin 12 is fixed beneath the frame 19 in a bracket 14 which surrounds the steering column of the bicycle. The pin 12 enables the tubes 11 to tilt forwards and backwards. The pin 13 is situated above the frame 19. Four rods 15 are secured to the tubes 11 and are all connected together at one of their ends constituting an undeformable "bowsprit" or jib that can be tilted up and down. At the end of the jib 15, a pulley 16 passes a control member 17 fixed to the tension member 8 of the rigging. The frame 19 is protected from friction against the tubes 11 by plastic sheaths.

Figure 3:
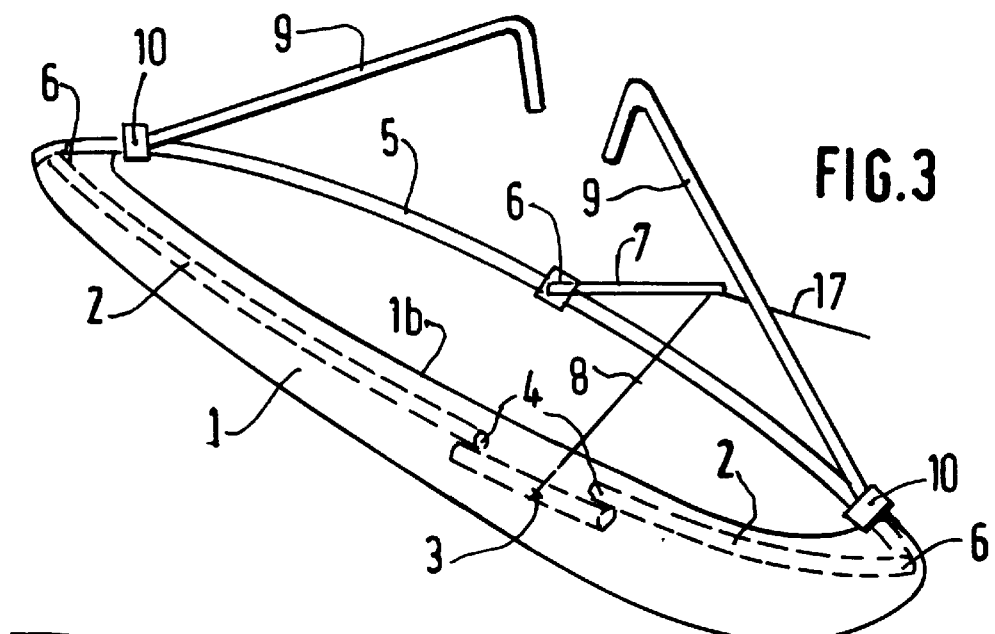
FIG. 3 is a plan view of the rigging after being made asymmetrical by laterally displacing its tension member, the rigging being shown immediately above the level of its horizontal spar.

FIG. 3 shows the asymmetrical deformation of the sail under thrust from the spar 5 caused by the boom 7 when the tension member 8 moves towards the leading edge of the sail 1. At this edge, the upright 2 tends to straighten out, causing the bars 3 to move more into line with the upright 2 situated at the trailing edge. This causes the belly of the sail to move forwards, thereby increasing the effectiveness of the sail.

The cyclist (not shown in FIG. 1) can operate the control 17 fixed to a chest harness such that forwards and backwards movement thereof applies traction to the control 17 which performs five functions:

increasing the tension in the tension member cable 8, thereby causing the sail 1 to bulge by curving the uprights 2;

modify the profile of the sail 1 by displacing the belly of the sail forwards;

acting like a sheet on the sail to increase its angle relative to the path of the vehicle;

tilting the rigging backwards by urging the jib 15 upwards, thereby reducing the sideways thrust on the front wheel; and urging the rigging to tilt towards a horizontal position by applying downwards traction on the tension member 8.

Figure 5:
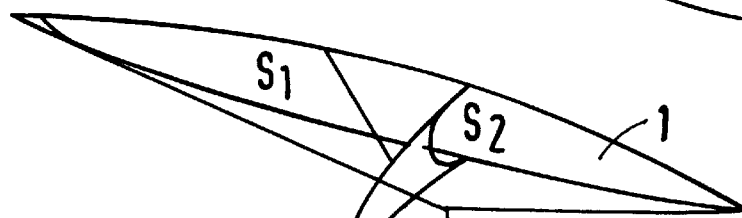
FIG. 5 is a profile view of the rigging in a horizontal position above a bicycle.

FIG. 5 shows this horizontal inclination which is also achieved automatically when changing tack when the rods 9 are mounted on the rigging 2 at a height that defines a surface area S1 that is greater than S2, S1 and S2 being the surface areas of the sail respectively above and below the ends of the rods. Changing tack takes place when there is a change in steering direction:

a) by tilting the sail horizontally because of wind thrust on the suction surface thereof;

b) by rotating the rigging in the lie of the wind; and c) by rotating the rigging and standing it back up again because of wind thrust on its opposite surface. This change of tack can be facilitated by the cyclist pushing the rods 9 in the appropriate direction. Similarly, the sail can be adjusted with little effort since the resultant of the wind passing through the center of the sail passes close to the center of traction. Cyclist safety in the event of a gust is provided by sitting up on the saddle which, by means of the chest harness, causes the sail to catch less wind.

For safety purposes, two guards 18 are provided (shown in FIG. 1) connecting the uprights of the rigging to the rods 9 and preventing the rods of the rigging from coming into contact with the bicycle in the event of the control 17 not being held by the cyclist, for any reason whatsoever.

Figure 6:
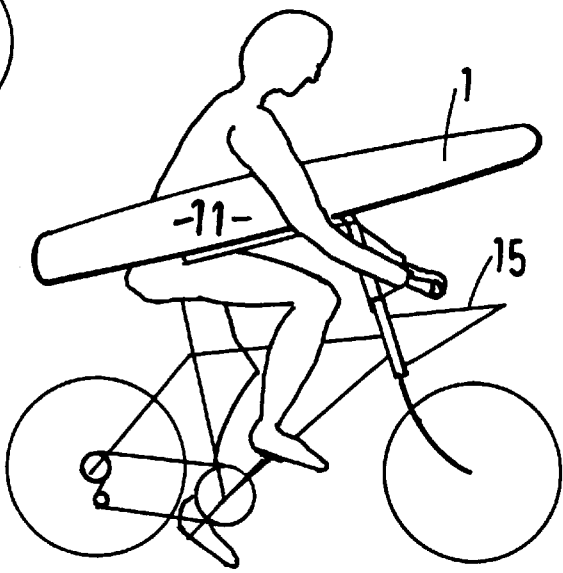
FIG. 6 is a profile view of a cyclist transporting the rigging in the folded and wrapped-up condition, and held on the rods which are engaged in the support on the bicycle.

FIG. 6 shows how the rigging can be transported in the folded and wrapped position, being carried on the rods 9 and extending rearwards in the support 11 without hindering the action of the cyclist when it comes to moving by means of the pedals. In addition, after the rods 9 have been removed, the support shown in FIG. 4 can remain permanently in place on the bicycle, thereby reducing the time required for installing the rigging.

The invention is not limited to bicycles and can be used on any land or water vehicle suitable for being driven by the wind.

Naturally, numerous variants can be provided, in particular by substituting equivalent technical means, without thereby going beyond the ambit of the invention.

I claim:

1. Rigging for a vehicle, the rigging comprising a sail and a support for mounting the sail on the vehicle, wherein the sail is tensioned on a frame comprising two flexible uprights having a tension member fixed thereto and two bars hingedly attached at opposite ends between the two flexible uprights, the bars, at rest, being perpendicular to the direction of the tension member, the bars and uprights, at rest, together forming a symmetrical shape, action on the tension member changing the symmetrical shape of the frame into an asymmetrical shape.

2. Rigging according to claim 1, including a spar on which one end of a boom is hinged, with the second end of the boom being slidably mounted on the tension member.

3. Rigging according to claim 2, wherein the spar is hingedly attached at an end of each of two rods forming a support for maintaining lateral position relative to the vehicle propelled by the wind.

4. Rigging according to claim 4, wherein each rod has a bend, the end remote from the hingedly attached end being pivotally mounted in one of two parallel tubes of the support to enable the rigging to be held or tilted in a plane parallel to the axis of the vehicle, the tubes being assembled together by means of a horizontal pin, the pin adapted to be supported by a bracket adapted to be fixed to the vehicle.

5. Rigging according to claim 4, wherein the tubes are assembled together by a second pin to enable the tubes to tilt, the tubes including a forwardly-directed jib.

6. Rigging according to claim 5, wherein the support includes a forwardly-directed jib comprising four rods fixed to the support tubes via the pins, and a pulley being mounted at the front end of the jib.

7. Rigging according to claim 6, wherein a traction control adapted to be secured to a user at one of its ends, passes over the pulley with the second end of the control being connected to the tension member.

8. Rigging according to claim 4, wherein the inclination of the rigging relative to the vehicle is limited by a system of guards.

9. Rigging according to claim 1, wherein the sail is tensioned on the uprights and the bars by being enveloped around them by means of adjustable peripheral lacing.

10. Rigging for a vehicle having a frame and a steering column, the rigging comprising a sail and a support for mounting the sail on the vehicle, wherein the sail is tensioned on a sail frame comprising two flexible uprights having a tension member fixed thereto and two bars hingedly attached at opposite ends between the two flexible uprights, the bars, at rest, being perpendicular to the direction of the tension member, the bars and uprights, at rest, together forming a symmetrical shape, action on the tension member changing the symmetrical shape of the sail frame into an asymmetrical shape.

11. Rigging according to claim 10, including a spar on which one end of a boom is hinged, with the second end of the boom being slidably mounted on the tension member.

12. Rigging according to claim 10, wherein the sail is tensioned on the uprights and the bars by being enveloped around them by means of adjustable peripheral lacing.

13. Rigging according to claim 10, wherein the spar is hingedly attached at an end of each of two rods forming a support for maintaining lateral position relative to the vehicle propelled by the wind.

14. Rigging according to claim 13, wherein each rod has a bend, the end remote from the hingedly attached end being pivotally mounted in one of two parallel tubes of the support secured on either side of the frame of the vehicle to enable the rigging to be held or tilted in a plane parallel to the axis of the vehicle, the tubes being assembled together by means of a horizontal pin adapted to be situated beneath the frame of the vehicle, the pin being supported by a bracket adapted to be fixed to the steering column of the vehicle.

15. Rigging according to claim 14, wherein the tubes are assembled together by a second pin adapted to pass above the frame to enable the tubes to tilt about the horizontal pin, the tubes including a forwardly-directed jib.

16. Rigging according to claim 15, wherein the support includes a forwardly-directed jib comprising four rods passing on either side of the steering column, fixed to the support tubes via the pins, and a pulley being mounted at the front end of the jib.

17. Rigging according to claim 16, wherein a traction control adapted to be secured to a user at one of its ends, passes over the pulley with the second end of the control being connected to the tension member.

18. Rigging according to claim 14, wherein the inclination of the rigging relative to the frame of the vehicle is limited by a system of guards.

* * * * *

UNITED STATES PATENT AND TRADEMARK OFFICE
CERTIFICATE OF CORRECTION

PATENT NO.   : 5,806,451
DATED        : September 15, 1998
INVENTOR(S)  : Patrick Carn It is certified that error appears in the above-identified patent and that said Letters Patent is hereby corrected as shown below:

Col. 3, line 59 Claim 4, after the word "claim", delete "4" and insert therefor --3--.

Signed and Sealed this

Ninth Day of March, 1999

Attest:

Q. TODD DICKINSON

Attesting Officer

Acting Commissioner of Patents and Trademarks